United States Patent Office 2,820,035
Patented Jan. 14, 1958

2,820,035

BARBITURIC ACID DERIVATIVES

Heinz Scheffler and August Kottler, Biberach (Riss), Germany, assignors to C. H. Boehringer Sohn, Ingelheim (Rhine), Germany, a partnership No Drawing. Application October 5, 1954
Serial No. 460,514

Claims priority, application Germany October 7, 1953

9 Claims. (Cl. 260—257)

This invention relates to new aliphatic carboxylic acid derivatives and more particularly to new aliphatic carboxylic acid derivatives being substituted by at least one 2,5-endomethylene-$\Delta^3$-tetrahydrophenyl radical and to a process of making the same.

It is one object of our invention to provide new and valuable aliphatic carboxylic acid derivatives which are substituted by at least one 2,5-endomethylene-$\Delta^3$-tetrahydrophenyl radical and which represent valuable intermediates for the manufacture of therapeutically useful compounds or which, as such, are valuable pharmaceutical compounds.

Another object of the present invention is to provide a simple and effective process of producing such new and valuable derivatives of aliphatic carboxylic acids.

Other objects of the present invention and advantageous features thereof will become apparent as the description proceeds.

The new compounds are illustrated by the following formula

In said formula $R_1$ indicates a 2,5-endomethylene-$\Delta^3$-tetrahydrophenyl radical, of the formula

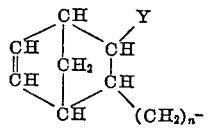

wherein Y is hydrogen or an alkyl radical and $n$ is an integer from 0 to 3;

$R_2$ indicates hydrogen, the same 2,5-endomethylene-$\Delta^3$-tetrahydrophenyl radical as indicated by $R_1$, a saturated alkyl radical or an unsaturated alkyl radical, said alkyl radicals having 1 to 12 carbon atoms and being of straight-chain or branched structure, an aryl radical, or an aralkyl radical;

$R_3$ indicates the carboxyl group or an esterified carboxyl group such as a $COOR_5$-group, wherein $R_5$ is a lower alkyl radical with 1 to 5 carbon atoms;

$R_4$ indicates the carboxyl group, an esterified carboxyl group, the cyano group or the acetyl group, and $R_3$ and $R_4$ together may represent a group of the formula

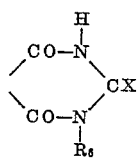

wherein X indicates sulfur, oxygen, or the imino group =NH and $R_6$ indicates hydrogen or an alkyl, aryl, or aralkyl radical, or an acyl group.

$R_1$ and $R_2$ in said formula may be substituted by one or several halogen atoms and preferably by bromine.

Compounds according to the present invention are, for instance, acids of the folowing formula

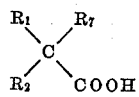

or their esters. In said formula $R_1$ and $R_2$ indicate the same substituents as mentioned hereinbefore, while $R_7$ is an esterfied carboxyl group, a cyano group, or the acetyl group.

The new esters are produced, according to the present invention, by reacting the alkali metal or alkaline earth metal compounds of substances of the formula

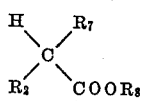

wherein $R_2$ and $R_7$ indicates the same substituents as mentioned hereinbefore while $R_8$ is an alkyl radical with 1 to 5 carbon atoms, under anhydrous conditions, with a 2,5-endomethylene-$\Delta^3$-tetrahydrophenyl halogen compound of the formula

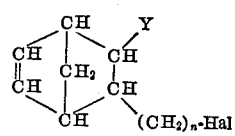

wherein Y and $n$ have the same meaning as indicated above while Hal represents halogen.

The reaction is advantageously carried out in a suitable solvent, such as ethanol, methanol, xylene, and the like, and preferably at elevated temperature; for instance, by heating the reaction mixture under reflux. The preferred temperature range is between about 80° C. and about 160° C. Furthermore, reaction may be effected under pressure, if required. The starting materials, i. e. the alkali metal or alkaline earth metal compounds can be produced according to methods known per se; for instance, by means of alkali metals or alkaline earth metals, or their alcoholates, hydroxides, amides, hydrides, etc.

The new compounds can also be produced by reacting a compound of the formula

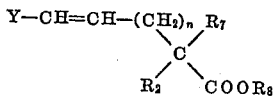

wherein $R_2$, $R_7$, $R_8$, Y, and $n$ have the same meaning as indicated above, with cyclopentadiene. On carrying out this reaction it is advisable to operate in the presence of solvents as they are conventionally used in the Diels-Alder reaction, such as benzene, xylene, etc. Working in a closed container, i. e. under pressure, and at elevated temperature is of advantage. The preferred temperature range in this reaction is between about 100° C. and about 200° C. It is expedient to add a stabilizer, for instance iron powder, to the reaction mixture. Advantageously, the reaction is carried out in the absence of moisture.

When effecting the above-indicated reactions with starting materials wherein $R_2$ is hydrogen, it is possible to subsequently introduce into the molecule a substituent $R_2$ having the same composition as indicated above, of course with the exception of hydrogen.

Most of the new esters obtained according to the present invention represent colorless to yellowish liquids of high boiling point. They can be saponified to the corresponding acids. Decarboxylation yields the corresponding acetic acid compounds if $R_7$ is an esterified carboxyl group, or acetonitriles if $R_7$ is a cyano group, or ketones if $R_7$ is the acetyl group. They can also be converted into other functional derivatives; for instance, into their amides.

Compounds of this type produced according to the present invention are valuable starting materials for further synthetic processes. They can be used, for instance, for the preparation of therapeutic agents, such as new barbituric acid derivatives and others according to another embodiment of the present invention.

Said new barbituric acid derivatives correspond to the following formula

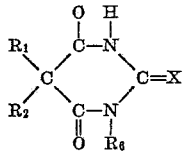

In said formula $R_1$ indicates a 2,5-endomethylene-$\Delta^3$-tetrahydrophenyl radical of the formula

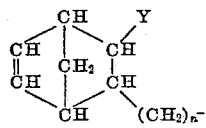

wherein Y is hydrogen or an alkyl radical and $n$ is an integer from 0 to 3;

$R_2$ indicates hydrogen, the same 2,5-endomethylene-$\Delta^3$-tetrahydrophenyl radical as indicated by $R_1$, a saturated or an unsaturated alkyl radical, said alkyl radical having 1 to 5 carbon atoms and being of straight-chain or branched structure, an aryl radical, or an aralkyl radical;

$R_6$ indicates hydrogen or an alkyl, aryl, or aralkyl radical, or an acyl group; and X indicates sulfur, oxygen, or the imino group =NH; and wherein the radicals $R_1$ and $R_2$ may be substituted by one or several halogen atoms and preferably by bromine.

Said new barbituric acid derivatives are produced, according to the present invention, by reacting esters of the formulas

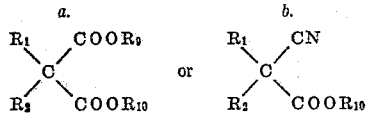

wherein $R_1$ and $R_2$ indicate the same substituents as mentioned hereinbefore and $R_9$ and $R_{10}$ are alkyl radicals, in the presence of an alkaline condensing agent with compounds of the formulas

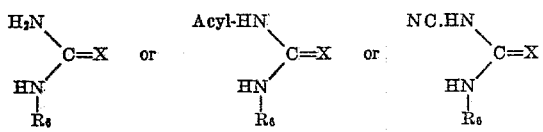

wherein X and $R_6$ have the same meaning as indicated hereinbefore while Acyl is an acyl group. Alkali metals or derivatives thereof, such as their alcoholates, amides, hydroxides, hydrides, or organo-metal compounds thereof are used as such condensing agents. Especially suitable are sodium methylate, sodium ethylate, or sodium amide. The reaction is preferably carried out in the presence of organic solvents such as, for instance, methanol, ethanol, propanol, butanol, benzene, toluene, xylene, etc. It is expedient to operate at elevated temperature; for instance in the temperature range between about 80° C. and about 140° C.

When using guanidines or dicyanodiamides as the one reaction component, i. e. compounds of the above given formula wherein X is the imino group =NH, the corresponding imino or cyano imino compounds are obtained. Said condensation products, if desired, can be converted by hydrolysis, preferably in acid solution, into the corresponding oxygen-containing barbituric acid derivatives.

When using N-acyl urea, N-acyl thiourea, and N-acyl guanidine compounds as the one reaction component, the acyl group is hydrolytically split off during condensation.

When starting with esters wherein $R_2$ indicates hydrogen and subjecting said starting material to the desired condensation reaction, it is possible to subsequently introduce into the resulting reaction products the substituent $R_2$ having the above indicated meaning, of course with the exception of hydrogen. Said substituent $R_2$ is introduced into the corresponding barbituric acid derivatives in the same manner as described hereinbefore with respect to the introduction of $R_2$ into malonic acid ester derivatives, etc.

When using in said condensation reaction urea, thiourea, guanidine, or dicyano diamide yielding condensation products wherein the substituent $R_6$ is hydrogen, it is also possible to subsequently introduce into the resulting reaction product the substituent $R_6$ of the above indicated meaning, of course with the exception of hydrogen. Introduction of such a substituent $R_6$ is effected according to methods known per se. Halogen atoms can also be introduced into substituents $R_1$ and/or $R_2$ before or after ring closure condensation to barbituric acid derivatives.

The resulting barbituric acid derivatives possess valuable therapeutic properties. They are of low toxicity and exert even in low doses a long-lasting hypnotic effect. Their therapeutic range is considerably greater than that of many known compounds of this class of compounds. The new barbituric acid compounds may also serve as starting materials for the synthesis of other valuable compounds.

The following examples serve to illustrate the present invention without, however, limiting the same thereto.

*Example 1. — Ethyl - 2,5 - endomethylene - $\Delta^3$ - tetrahydrophenyl methyl malonic acid diethyl ester*

2.3 gm. of sodium metal are dissolved in 50 cc. of absolute ethanol. 18.8 gm. of ethyl malonic acid diethyl ester and 20.6 gm. of 2,5-endomethylene-$\Delta^3$-tetrahydrophenyl methylbromide are added to said solution. The reaction mixture is heated in a closed reaction vessel at 150° C. for several hours and, after cooling, is poured into water. Ethyl - 2,5 - endomethylene - $\Delta^3$ - tetrahydrophenyl methyl malonic acid diethyl ester precipitates as oily liquid. It is extracted with ether and is subsequently distilled in a vacuum. Boiling point: 167–169° C./10 mm. Yield: 60% of the theoretical yield.

The above indicated compound may also be produced by gradually adding 18.8 g. of ethyl malonic acid diethyl ester to a suspension of 2.3 g. of sodium metal powder in 100 cc. of anhydrous xylene. As soon as solution has taken place, 20.6 g. of 2,5-endomethylene - $\Delta^3$ - tetrahydrophenyl methylbromide are added thereto. The reaction mixture is boiled under reflux for 15 hours. Working up of the reaction mixture is carried out as described above. The ester is obtained in a yield between 60% and 70% of the theoretical yield.

*Example 2.—2,5-endomethylene-$\Delta^3$-tetrahydrophenyl methyl malonic acid diethyl ester*

108 gm. of mono-allyl malonic acid diethyl ester are mixed with 19.8 gm. of cyclopentadiene. 0.5 gm. of iron powder are added thereto and the mixture is heated in a closed reaction vessel at 180° C. for 42 hours. The mixture is distilled in a vacuum. The resulting 2,5-endomethylene-$\Delta^3$-tetrahydrophenyl methyl malonic acid diethyl ester has a boiling point of 163° C./11 mm. The yield is 60% of the theoretical yield.

This ester may also be obtained by first dissolving 3.8 g. of sodium metal in 100 cc. of absolute ethanol. 26.5 g. of malonic acid diethyl ester, 1 g. of sodium iodide, and 31 g. of 2,5-endomethylene-$\Delta^3$-tetrahydrophenyl methylbromide are added to said solution and the reaction mixture is heated in a closed reaction vessel at 150–160° C. for 8 to 12 hours. The desired ester is obtained in a yield of about 60–70% of the theoretical yield on working up the reaction mixture in an analogous manner as described in Example 1.

*Example 3.—Allyl-2,5-endomethylene-$\Delta^3$-tetrahydrophenyl methyl malonic acid diethyl ester*

26.6 gm. of 2,5-endomethylene-$\Delta^3$-tetrahydrophenyl methyl malonic acid diethyl ester obtained according to Example 2 are added to a solution of 2.3 gm. of sodium metal in 60 cc. of absolute ethanol. 13.3 gm. of allylbromide are gradually added thereto drop by drop and the mixture is boiled under reflux for 3 hours. The alcohol is distilled off, the residue is taken up in water and is extracted with ether. The ethereal solution is evaporated to dryness and the residue is distilled in a vacuum. The boiling point of the resulting malonic acid ester compound is 172–174° C./10 mm. Yield: 70% of the theoretical yield.

This ester may also be produced by first dissolving 2.3 g. of sodium metal in 100 cc. of absolute ethanol. 20.0 g. of allyl malonic acid diethyl ester and 19.2 g. of 2,5-endomethylene-$\Delta^3$-tetrahydrophenyl methylbromide are added to said solution and the reaction mixture is boiled under reflux for 24 hours. The desired ester is obtained in a yield of about 55–60% of the theoretical yield on working up the reaction mixture in an analogous manner as described above.

*Example 4.—Ethyl-2,5-endomethylene-$\Delta^3$-tetrahydrophenyl malonic acid diethyl ester*

6.9 gm. of sodium metal are dissolved in 100 cc. of absolute ethanol. 56.4 gm. of ethyl malonic acid diethyl ester and 200 cc. of anhydrous xylene are added to said solution. The alcohol is distilled off and 57 gm. of 2,5-endomethylene - 1 - bromo - $\Delta^3$ - tetrahydrobenzene are added to the residue. The mixture is boiled under reflux for 30 hours. After cooling, water is added thereto, the xylene solution is separated, washed with water, dried, xylene is removed by distillation, and the residue is distilled in a vacuum. Boiling point: 162–164° C./12 mm. Yield: 65% of the theoretical yield.

This ester may also be obtained by reacting the sodium salt of 2,5-endomethylene-$\Delta^3$-tetrahydrophenyl malonic acid diethyl ester with the equivalent amount of ethylbromide in absolute ethanolic solution, and thereafter boiling the reaction mixture for several hours. The resulting ester is obtained in a yield of about 75% of the theoretical yield on working up the reaction mixture in an analogous manner as described in Example 3.

The sodium salt used in this embodiment of the invention is obtained by the addition of a solution of the equivalent amount of sodium metal in absolute ethanol to 2,5-endomethylene-$\Delta^3$-tetrahydrophenyl malonic acid diethyl ester prepared according to Example 5 hereof.

*Example 5.—2,5 - endomethylene - $\Delta^3$ - tetrahydrophenyl malonic acid diethyl ester*

128 gm. of malonic acid diethyl ester and 152 gm. of 2,5 - endomethylene - 1 - bromo - $\Delta^3$ - tetrahydrobenzene are added to a solution of 18.4 gm. of sodium metal in 400 cc. of absolute ethanol. The mixture is heated in a heavy-walled sealed glass tube at 150° C. for 20 hours. After cooling, water is added to the content of the tube and the mixture is extracted with ether. The ethereal solution is washed with water, evaporated to dryness, and the residue is distilled in a vacuum. Boiling point: 154–158° C./12 mm. Yield: 55% of the theoretical yield.

*Example 6.—Allyl-2,5-endomethylene-$\Delta^3$-tetrahydrophenyl malonic acid diethyl ester*

40.4 gm. of 2,5-endomethylene-$\Delta^3$-tetrahydrophenyl malonic acid diethyl ester obtained according to Example 5 are added to a solution of 3.68 gm. of sodium metal in 150 cc. of absolute ethanol. 19.4 gm. of allylbromide are added at room temperature to said mixture. Thereafter, the mixture is heated under reflux for 2 hours, the alcohol is distilled off, the residue is taken up in water and is extracted with ether. The ethereal solution is washed with water until it is of neutral reaction, evaporated to dryness, and the residue is distilled in a vacuum. Boiling point: 174–178° C./15 mm. Yield: 70% of the theoretical yield.

This ester may also be obtained by boiling a solution of sodium allyl malonic acid diethyl ester in anhydrous xylene with the equivalent amount of 2,5-endomethylene-1-bromo-$\Delta^3$-tetrahydrobenzene for 30 hours. The reaction mixture is worked up in an analogous manner as described in Example 4 and yields the above mentioned ester in a yield of about 50–55% of the theoretical yield.

*Example 7.—2,5-endomethylene-$\Delta^3$-tetrahydrophenyl methyl cyano acetic acid ethyl ester*

88 gm. of mono-allyl cyano acetic acid ethyl ester, 21 gm. of cyclopentadiene, and 1 gm. of iron powder are heated in a closed reaction vessel at 180–185° C. for 14 hours. After cooling, the reaction product is distilled in a vacuum. Boiling point: 170–185° C./14 mm. Yield: 62% of the theoretical yield.

*Example 8.—Methyl-2,5-endomethylene-$\Delta^3$-tetrahydrophenyl methyl malonic acid diethyl ester*

2.3 g. of sodium metal are dissolved in 100 cc. of absolute ethanol. 17.4 g. of methyl malonic acid diethyl ester and 19.2 g. of 2,5-endomethylene-$\Delta^3$-tetrahydrophenyl methyl bromide are added to said solution. The reaction mixture is boiled for 24 hours under reflux. Thereafter the ethanol is removed by evaporation and water is added to the remaining residue. Thereby the desired ester precipitates in the form of an oil. The oil is extracted by shaking with ether, the ethereal solution is dried over anhydrous sodium sulfate and is evaporated to dryness. The remaining residue is distilled in a vacuum. The resulting ester boils at 147–151° C./10 mm. The yield is about 50–60% of the theortical yield.

*Example 9.—Butyl-2,5-endomethylene-$\Delta^3$-tetrahydrophenyl methyl malonic acid diethyl ester*

3.8 g. of sodium metal are dissolved in 100 cc. of absolute ethanol. 35.6 g. of butyl malonic acid diethyl ester and 31.0 g. of 2,5-endomethylene-$\Delta^3$-tetrahydrophenyl methylbromide are added to said solution. The reaction mixture is heated in an autoclave at 150° C. for 16 hours. The ethanol is removed by evaporation after cooling the reaction mixture. The residue is mixed with water and the precipitating oil is extracted with ether. The ethereal solution is dried over anhydrous sodium sulfate and the ether is removed by distillation. The residue is distilled in a vacuum. The boiling point of the resulting ester is 185–187° C./12 mm. Yield: About 55% of the theoretical yield.

*Example 10.—Methyl-2,5-endomethylene-$\Delta^3$-tetrahydrophenyl malonic acid diethyl ester*

4.6 g. of sodium metal are dissolved in 100 cc. of absolute ethanol. 34.8 g. of methyl malonic acid diethyl ester, 2 g. of sodium iodide, and 38.0 g. of 2,5-endomethylene-1-bromo-$\Delta^3$-tetrahydrobenzene are added to said solution. The mixture is heated in a closed reaction container at 150° C. for 20 hours. After cooling, the ethanol is distilled off, water is added to the residue, and the mixture is extracted with ether. The ethereal solution is dried over anhydrous sodium sulfate and evaporated to dryness. The residue is distilled in a vacuum. The boiling point of the resulting ester is 148–152° C./10 mm. Yield: About 55–60% of the theoretical yield.

*Example 11.—Isopropyl-2,5-endomethylene-$\Delta^3$-tetrahydrophenyl methyl malonic acid diethyl ester*

3.5 g. of sodium metal are dissolved in 100 cc. of absolute ethanol. 30.4 g. of isopropyl malonic acid diethyl ester, 2 g. of sodium iodide, and 30.0 g. of 2,5-endomethylene-$\Delta^3$-tetrahydrophenyl methylbromide are added to said solution. The mixture is heated at 180° C. in a closed reaction vessel for 15 hours. The ethanol is removed by distillation, water is added to the residue, and the oil precipitating on said water addition is extracted with ether. The ethereal solution is dried over anhydrous sodium sulfate, and the ether is removed therefrom by distillation. The residue is distilled in a vacuum. The boiling point of the resulting ester is 160–165° C./11 mm. Yield: About 65% of the theoretical yield.

*Example 12.—n-Butyl-2,5-endomethylene-$\Delta^3$-tetrahydrophenyl malonic acid diethyl ester*

4.6 g. of sodium metal are dissolved in 100 cc. of absolute ethanol. 43.2 g. of n-butyl malonic acid diethyl ester, 38.0 g. of 2,5-endomethylene-1-bromo-$\Delta^3$-tetrahydrobenzene, and 2 g. of sodium iodide are added to said solution. The mixture is heated in an autoclave at 150° C. for 24 hours. After cooling, the ethanol is removed by distillation, water is added to the residue, and the precipitated oil is extracted with ether. The ethereal solution is dried over anhydrous sodium sulfate and the ether is removed by distillation. The remaining residue is distilled in a vacuum. The resulting ester has a boiling point of 165–170° C./10 mm. Yield: About 50% of the theoretical yield.

*Example 13.—Isopropyl-2,5-endomethylene-$\Delta^3$-tetrahydrophenyl malonic acid diethyl ester*

4.6 g. of sodium metal are dissolved in 100 cc. of absolute ethanol. 40.4 g. of isopropyl malonic acid diethyl ester, 2 g. of sodium iodide, and 38.0 g. of 2,5-endomethylene-1-bromo-$\Delta^3$-tetrahydrobenzene are added to said solution. The mixture is heated in an autoclave at 150–160° C. for 20 hours. After cooling, the ethanol is removed by distillation, water is added to the residue, and the precipitated oil is extracted with ether. The ethereal solution is dried over anhydrous sodium sulfate and the ether is removed by distillation. The residue is distilled in a vacuum. The resulting ester has a boiling point of 158–162° C./11 mm. Yield: About 45% of the theoretical yield.

*Example 14.—Allyl-2,5-endomethylene-$\Delta^3$-tetrahydrophenl methyl cyano acetic acid ethyl ester*

11.4 g. of magnesium ethylate and 43.8 g. of 2,5-endomethylene-$\Delta^3$-tetrahydrophenyl methyl cyano acetic acid ethyl ester prepared according to Example 7 are dissolved in 200 cc. of anhydrous toluene. 26.6 g. of allyl bromide are added to said solution. The mixture is heated at 80° C. for 8 hours while stirring. After cooling, water is added thereto and the mixture is slightly acidified by the addition of dilute hydrochloric acid. The organic solvent phase is separated, washed with water until it is of neutral reaction, and evaporated to dryness. The residue is distilled in a vacuum. The boiling point of the resulting ester is 170–176° C./13 mm. Yield: About 57% of the theoretical yield.

*Example 15.—Isoamyl-2,5-endomethylene-$\Delta^3$-tetrahydrophenyl malonic acid diethyl ester*

3.5 g. of sodium amide are suspended in 70 cc. of anhydrous xylene. 39.0 g. of 2,5-endomethylene-$\Delta^3$-tetrahydrophenyl malonic acid diethyl ester prepared according to Example 5, are added to said suspension while stirring. During said addition ammonia gas is generated. The reaction mixture is heated until gas generation has ceased. 25.6 g. of isoamylbromide are added to the mixture which is then boiled under reflux for 20 hours while stirring. After cooling, water is added thereto. The organic solvent phase is washed with water and evaporated to dryness. The residue is distilled in a vacuum. The resulting ester boils at 178–185° C./10 mm. Yield: About 54% of the theoretical yield.

*Example 16.—Bis-(2,5-endomethylene-$\Delta^3$-tetrahydrophenyl methyl) malonic acid diethyl ester*

29.0 g. of allyl-2,5-endomethylene-$\Delta^3$-tetrahydrophenyl methyl malonic acid diethyl ester prepared according to Example 3, are mixed with 5.4 g. of pure cyclopentadiene. The mixture is heated in a closed container at 180° C. for 14 hours. After cooling, the reaction product is distilled in a vacuum. The resulting ester boils at 200–210° C./10 mm. Yield: About 45% of the theoretical yield.

*Example 17.—Allyl 2,5endomethylene-$\Delta^3$-tetrahydrophenyl malonic acid dimethyl ester*

344 g. of monoallyl malonic acid dimethyl ester are mixed with 384 cc. of 30% methanolic sodium methylate solution and 500 cc. of dimethyl aniline. The methanol is distilled off by means of a fraction column. 346 g. of 2,5-endomethylene-1-bromo-$\Delta^3$-tetrahydrobenzene are added to the residue and the mixture is heated at 130–135° C. for 65 hours while stirring. After cooling, water is added to the mixture which is then acidified by the addition of hydrochloric acid and is finally extracted by shaking with ether. The ethereal solution is washed with water until neutral, dried over anhydrous sodium sulfate, and evaporated to dryness. The residue is distilled in a vacuum. The boiling point of the resulting ester is 152–154° C./9 mm. Yield: About 65–70% of the theoretical yield.

*Example 18.—2,5-endomethylene-$\Delta^3$-tetrahydrophenyl malonic acid dibutyl ester*

4.6 g. of sodium metal are dissolved in 150 cc. of absolute n-butanol. 43.2 g. of malonic acid dibutyl ester, 2.5 g. of sodium iodide, and 38.0 g. of 2,5-endomethylene-1-bromo-$\Delta^3$-tetrahydrobenzene are added to said solution. The mixture is heated to boiling under reflux for 12 hours while stirring. The resulting reaction mixture is poured into water, the aqueous phase is separated, and the organic solvent layer is concentrated by evaporation in a vacuum. The residue is distilled in a vacuum. The resulting ester boils at 185–190° C./14 mm. Yield: About 60% of the theoretical yield.

*Example 19.—Ethyl-2,5-endomethylene-$\Delta^3$-tetrahydrophenyl malonic acid dibutyl ester*

46 g. of sodium metal are dissolved in 900 cc. of absolute n-butanol. 488 g. of ethyl malonic acid dibutyl ester, and 346 g. of 2,5-endomethylene-1-bromo-$\Delta^3$-tetrahydrobenzene are added to said solution. The mixture is boiled under reflux for 72 hours while stirring. After cooling, the reaction mixture is poured into water, vigorously shaken, and allowed to separate into an aqueous layer and an organic solvent layer. The aqueous layer is separated and the organic solvent layer is concentrated by evaporation in a vacuum. The residue is distilled in a vacuum. The boiling point of the resulting ester is 190–195° C./10 mm. Yield: About 63% of the theoretical yield.

*Example 20.—2,5-endomethylene-$\Delta^3$-tetrahydrophenyl methyl aceto acetic acid ethyl ester*

100 g. of allyl aceto acetic acid ethyl ester are mixed with 33 g. of pure cyclopentadiene and 25 cc. of water-free benzene. The mixture is heated in a closed reaction vessel at 180° C. for about 14 hours. The reaction product is subsequently distilled in a vacuum. The resulting ester boils at 161–166° C./18 mm. Yield: About 55% of the theoretical yield.

*Example 21.—Ethyl-2,5-endomethylene-$\Delta^3$-tetrahydrophenyl malonic acid*

140 g. of ethyl-2,5-endomethylene-$\Delta^3$-tetrahydrophenyl malonic acid diethyl ester prepared according to Example 4 are dissolved in 250 cc. of 93% ethanol. A solution of 84 g. of potassium hydroxide in 200 cc. of water is added thereto and the mixture is boiled under reflux for 40 hours. The ethanol is then removed by evaporation in a vacuum, the residue is diluted with water, extracted with ether, and filtered over decolorizing carbon. The colorless aqueous filtrate is acidified by the addition of 10% hydrochloric acid in the cold. The oily precipitate is extracted by shaking with ether. The ether solution is dried over anhydrous sodium sulfate and the ether is evaporated therefrom. The resulting residue is recrystallized from a mixture of chloroform and petroleum ether (1:4). Melting point of the resulting malonic acid: 148° C. (with decomposition). Field: About 70% of the theoretical yield.

*Example 22.—Allyl - 2,5 - endomethylene-$\Delta^3$-tetrahydrophenyl malonic acid*

Allyl - 2,5-endomethylene-$\Delta^3$-tetrahydrophenyl malonic acid diethyl ester prepared according to Example 6, is saponified and the resulting saponification mixture is worked up in an analogous manner as described in Example 26. The resulting malonic acid is recrystallized from a mixture of chloroform and petroleum ether (1:4) and has a melting point of 156° C. (with decomposition). Yield: About 70% of the theoretical yield.

*Example 23.—Ethyl - 2,5 - endomethylene-$\Delta^3$-tetrahydrophenyl acetic acid*

15 g. of ethyl-2,5-endomethylene-$\Delta^3$-tetrahydrophenyl malonic acid obtained according to Example 26 are heated with 0.5 cc. of pure pyridine at 160° C. until carbon dioxide generation ceases. The reaction product is distilled in a vacuum. Its boiling point is 155° C./12 mm. The yield is about 67% of the theoretical yield. Its acid chloride which is obtained from the free acid by means of thionyl chloride boils at 135–137° C./12 mm.

*Example 24.—Allyl - 2,5 - endomethylene-$\Delta^3$-tetrahydrophenyl acetic acid*

Allyl - 2,5-endomethylene-$\Delta^3$-tetrahydrophenyl malonic acid obtained according to Example 27 is heated with 0.5 cc. of pure pyridine at 160° C. until carbon dioxide generation ceases. The reaction product is distilled in a vacuum. Its boiling point is 161–165° C./12 mm. The yield is about 70% of the theoretical yield. Its acid chloride boils at 137–140° C./12 mm. It is obtained from the free acid by means of thionyl chloride.

In place of ethyl malonic acid diethyl ester used in Example 1, of malonic acid diethyl ester used in Example 5 or of mono-allyl cyano acetic acid ethyl ester used in Example 7, or other malonic acid, cyano acetic acid, or aceto acetic acid esters mentioned in the preceding Examples 1 to 24, there may be employed equimolecular amounts of the following compounds:

Methyl malonic acid dimethyl ester
n-Propyl malonic acid di-n-propyl ester
Dodecyl malonic acid diethyl ester
Isoamyl malonic acid di-isoamyl ester
Undecenyl malonic acid diethyl ester
Phenyl malonic acid diethyl ester
Benzyl malonic acid diethyl ester
2,5-endomethylene-$\Delta^3$-tetrahydrophenyl malonic acid diethyl ester
p-Chloro phenyl malonic acid diethyl ester
p-Bromo o-tolyl malonic acid diethyl ester
Allyl malonic acid di-n-butyl ester
2-bromo allyl malonic acid diethyl ester
1-methyl butenyl malonic acid diethyl ester
n-Hexyl malonic acid diethyl ester
1-methyl butyl malonic acid diethyl ester
Isobutyl malonic acid di-isobutyl ester
2,5-endomethylene-$\Delta^3$-tetrahydrophenyl methyl malonic acid diethyl ester
6-ethyl-2,5-endomethylene-$\Delta^3$-tetrahydrophenyl ethyl malonic acid diethyl ester
6-bromo-2,5-endomethylene-$\Delta^3$-tetrahydrophenyl n-propyl malonic acid diethyl ester
Methyl cyano acetic acid ethyl ester
Decyl cyano acetic acid ethyl ester
Phenyl cyano acetic acid n-butyl ester
2,5-endomethylene-$\Delta^3$-tetrahydrophenyl cyano acetic acid amyl ester
p-Bromo benzyl cyano acetic acid ethyl ester
2-bromo allyl cyano acetic acid ethyl ester
Aceto acetic acid ethyl ester
Methyl aceto acetic acid methyl ester
Propyl aceto acetic acid propyl ester
Octyl aceto acetic acid ethyl ester
p-Tolyl aceto acetic acid ethyl ester
p-Bromo benzyl aceto acetic acid ethyl ester
2,5-endomethylene-$\Delta^3$-tetrahydrophenyl aceto acetic acid ethyl ester and others.

In place of 2,5 - endomethylene-$\Delta^3$-tetrahydrophenyl methyl bromide used in Example 1, and 2,5-endomethylene-1-bromo-$\Delta^3$-tetrahydrobenzene used in Example 4, there may be employed equimolecular amounts of the following compounds:

2,5-endomethylene-$\Delta^3$-tetrahydrophenyl ethyl bromide
6-ethyl - 2,5-endomethylene-$\Delta^3$-tetrahydrophenyl n-propyl bromide
6-dodecyl-2,5-endomethylene-$\Delta^3$-tetrahydrophenyl methyl chloride
6-methyl-2,5-endomethylene-$\Delta^3$-tetrahydrophenyl iodide
6 - n - butyl-2,5-endomethylene-$\Delta^3$-tetrahydrophenyl isopropyl bromide and others.

*Example 25.—5 - ethyl - 5-(2,5-endomethylene-$\Delta^3$-tetrahydrophenyl methyl) barbituric acid*

14.5 gm. of ethyl - 2,5 - endomethylene-$\Delta^3$-tetrahydrophenyl methyl malonic acid diethyl ester obtained, for instance according to Example 1, and 3.6 gm. of urea are added to a solution of 1.37 gm. of sodium metal in 500 cc. of absolute ethanol. The mixture is heated at a temperature between about 100° C. and about 120° C. for 10 hours whereby the ethanol is slowly and gradually distilled off. The residue is dissolved in water, the aqueous solution is filtered over decolorizing carbon, and the filtrate is acidified with dilute hydrochloric acid. 5-ethyl-5-(2,5-endomethylene-$\Delta^3$-tetrahydrophenyl methyl) barbituric acid precipitates in crystalline form. After recrystallization from dilute methanol it melts at 157–158° C. Yield: 55–60% of the theoretical yield.

*Analysis.*—Calculated—10.67% N. Found—10.71% N.

*Example 26.—5-allyl-5-(2,5-endomethylene-$\Delta^3$-tetrahydrophenyl methyl) barbituric acid*

50 gm. of allyl-2,5-endomethylene-$\Delta^3$-tetrahydrophenyl methyl malonic acid diethyl ester obtained according to Example 3, and 13.8 gm. of urea or 23.4 gm. of acetyl urea are added to a solution of 4.15 gm. of sodium metal in 120 cc. of absolute ethanol. The mixture is boiled under reflux for 2 hours whereupon the ethanol is distilled off within 7 hours. The residue is dissolved in water, the aqueous solution is filtered over activated charcoal, and the filtrate is acidified with dilute hydrochloric acid. 5-allyl-5-(2,5-endomethylene-$\Delta^3$-tetrahydrophenyl methyl) barbituric acid precipitates in crystalline form. It melts, on recrystallization from aqueous ethanol, at 166° C. Yield: 70% of the theoretical yield.

*Analysis.*—Calculated—10.17% N. Found—10.05% N.

*Example 27.—5-allyl-5-(2,5-endomethylene-Δ³-tetrahydrophenyl methyl) thiobarbituric acid*

19.0 gm. of allyl-2,5-endomethylene-Δ³-tetrahydrophenyl methyl malonic acid diethyl ester obtained according to Example 3, and 7.6 gm. of thiourea are added to a solution of 2.3 gm. of sodium metal in 100 cc. of absolute butanol. The mixture is boiled under reflux for 12 hours whereupon the butanol is distilled off within 24 hours. The residue is dissolved in cold water, the aqueous solution is filtered over decolorizing carbon, and the filtrate is acidified with dilute hydrochloric acid. The resulting precipitate is recrystallized from ethanol. Melting point: 205° C. (with decomposition). Yield: 65% of the theoretical yield.

*Analysis.*—Calculated—9.62% N. Found—9.8% N.

*Example 28.—5-ethyl-5-(2,5-endomethylene-Δ³-tetrahydrophenyl) barbituric acid*

32.0 gm. of ethyl-2,5-endomethylene-Δ³-tetrahydrophenyl malonic acid diethyl ester obtained according to Example 4, and 13.8 gm. urea or 23.4 gm. of acetyl urea are added to a solution of 5.3 gm. of sodium metal in 150 cc. of absolute butanol. The mixture is heated at 110–120° C. for 24 hours, whereby the mixture of ethanol and butanol is slowly and gradually distilled off. The solid residue is dissolved in water, the aqueous solution is filtered over decolorizing carbon, and the filtrate is acidified with dilute hydrochloric acid. 5-ethyl-5-(2,5-endomethylene-Δ³-tetrahydrophenyl) barbituric acid precipitates in crystalline form. After recrystallization from water it melts at 196–197° C. Yield: 70% of the theoretical yield.

*Analysis.*—Calculated—11.26% N. Found—11.3% N.

In place of the ethyl-2,5-endomethylene-Δ³-tetrahydrophenyl malonic acid diethyl ester, there can be employed equimolecular amounts of the corresponding ethyl-2,5-endomethylene-Δ³-tetrahydrophenyl malonic acid dibutyl ester as obtained according to Example 19.

*Example 29.—5-allyl-5-(2,5-endomethylene-Δ³-tetrahydrophenyl) barbituric acid*

25.0 gm. of allyl-2,5-endomethylene-Δ³-tetrahydrophenyl malonic acid diethyl ester obtained according to Example 6, and 5.9 gm. of guanidine are mixed with 40 cc. of a 15% sodium methylate solution in methanol. The reaction mixture is heated at 100° C. for 24 hours whereby a mixture of methanol and ethanol is gradually and slowly distilled off. The residue is dissolved in water, the aqueous solution is filtered over decolorizing carbon, and the filtrate is acidified with dilute hydrochloric acid.

The fine crystalline precipitate of 5-allyl-5-(2,5-endomethylene-Δ³-tetrahydrophenyl)-2-imino barbituric acid is hydrolyzed by boiling with 10% hydrochloric acid for 6 hours. The resulting 5-allyl-5-(2,5-endomethylene-Δ³-tetrahydrophenyl) barbituric acid, on repeated recrystallization from water, melts at 189–190° C. Yield: 55% of the theoretical yield.

*Analysis.*—Calculated—10.75% N. Found—10.56% N.

In place of the allyl-2,5-endomethylene-Δ³-tetrahydrophenyl malonic acid diethyl ester, there can be used the equimolecular amount of the corresponding allyl-2,5-endomethylene-Δ³-tetrahydrophenyl malonic acid dimethylester obtained according to Example 17.

In place of guanidine there can be used an equimolecular amount of urea as barbituric acid-forming reaction component. In this case saponification of the imino barbituric acid obtained when working with guanidine is eliminated since the desired barbituric acid is formed directly.

*Example 30.—5-allyl-5-(2,5-endomethylene-Δ³-tetrahydrophenyl) thiobarbituric acid*

25.0 gm. of allyl-2,5-endomethylene-Δ³-tetrahydrophenyl malonic acid diethyl ester obtained according to Example 6, and 7.6 gm. of thiourea are added to a solution of 2.3 gm. of sodium metal in 100 cc. of absolute ethanol. The mixture is heated at 100–120° C. for 24 hours whereby the ethanol is gradually and slowly distilled off. The residue is dissolved in water, the aqueous solution is filtered over decolorizing carbon, and the filtrate is acidified with dilute hydrochloric acid. A voluminous precipitate is formed thereby. Said precipitate, on repeated recrystallization from acetone/water (1:2), melts at 176–177° C.

*Analysis.*—Calculated—10.12% N. Found—9.7% N.

*Example 31.—5-allyl-5-(2,5-endomethylene-Δ³-tetrahydrophenyl) barbituric acid*

23.2 gm. of allyl-2,5-endomethylene-Δ³-tetrahydrophenyl malonic acid diethyl ester and 12.6 gm. dicyano diamide are added to a solution of 2.3 gm. of sodium metal in 100 cc. of absolute ethanol. The mixture is heated at 120° C. for 24 hours whereby the ethanol is distilled off. The residue is dissolved in water, the aqueous solution is filtered over decolorizing carbon, and the filtrate is acidified with dilute hydrochloric acid. First an oily precipitate is formed which, after standing for several hours while cooling, crystallized. The crystals are filtered off and boiled under reflux with 2 N sulfuric acid for 2 hours. On cooling, 5-allyl-5-(2,5-endomethylene-Δ³-tetrahydrophenyl) barbituric acid crystallizes. It melts at 189–190° C. and is identical with the compound obtained according to Example 29.

*Example 32.—5-methyl-5-(2,5-endomethylene-Δ³-tetrahydrophenyl)-N-methyl barbituric acid*

2.3 gm. of sodium metal are dissolved in 60 cc. of absolute ethanol. 14.5 gm. of methyl-2,5-endomethylene-Δ³-tetrahydrophenyl malonic acid diethyl ester obtained in analogous manner as described in Example 4 by reacting methyl malonic acid diethyl ester with 2,5-endomethylene-1-bromo-Δ³-tetrahydrobenzene, and 7.4 gm. of methyl urea or 11.5 gm. of methyl acetyl urea are added to said solution. The mixture is heated at 120° C. for 16 hours whereby the ethanol is gradually and slowly distilled off. The remaining residue is dissolved in water, the aqueous solution is filtered over decolorizing carbon, and the filtrate is acidified with dilute hydrochloric acid. The resulting precipitate is recrystallized from aqueous acetone. The barbituric acid melts at 152–153° C.

*Analysis.*—Calculated—11.3% N. Found—11.8% N.

*Example 33.—5-butyl-5-(2,5-endomethylene-Δ³-tetrahydrophenyl methyl) barbituric acid*

4.6 g. of sodium metal are dissolved in 200 cc. of absolute ethanol. 12.0 g. of urea, or 20.5 of acetyl urea, and 50.0 g. of butyl-2,5-endomethylene-Δ³-tetrahydrophenyl methyl malonic acid diethyl ester obtained according to Example 9 are added to said solution. The mixture is heated to a temperature between 90° C. and 130° C. for about 6 hours while stirring, whereby the alcohol is gradually distilled off. The reaction product is dissolved in water. The aqueous solution is filtered over decolorizing carbon, and the colorless filtrate is acidified with 10% hydrochloric acid. On rubbing and cooling, a crystalline precipitate is obtained which is filtered off by suction, dried, and recrystallized from a mixture of benzene and petroleum ether (1:3). The resulting barbituric acid melts at 141–142° C. Yield: About 60–70% of the theoretical yield.

*Analysis.*—Calculated—9.65% N. Found—9.5% N.

*Example 34.—5-methyl-5-(2,5-endomethylene-Δ³-tetrahydrophenyl methyl) barbituric acid*

1.5 g. of sodium metal are dissolved in 50 cc. of absolute ethanol. 3.9 g. of urea, or 6.7 g. of acetyl urea, and 15.5 g. of methyl-2,5-endomethylene-Δ³-tetrahydrophenyl methyl malonic acid diethyl ester are added to said solution. Said malonic acid ester is obtained, for instance, according to Example 8. The mixture is heated at a temperature between 90° C. and 140° C. for 5 hours whereby the alcohol is gradually distilled off. The reaction product is dissolved in water, the aqueous solution is filtered over decolorizing carbon, and the colorless filtrate is acidified with dilute hydrochloric acid. On cooling the acidified filtrate in ice water, and initiating crystallization by rubbing, a crystalline precipitate is obtained which is filtered off by suction and is recrystallized from aqueous methanol while still wet. Its melting point is 271° C. Yield: About 66% of the theoretical yield.

*Analysis.*—Calculated—11.3% N. Found—11.5% N.

Example 35.—*5-isopropyl-5-(2,5-endomethylene-$\Delta^3$-tetrahydrophenyl methyl) barbituric acid*

1.2 g. of sodium metal are dissolved in 50 cc. of absolute ethanol. 3.0 g. of urea, or 5.1 g. of acetyl urea, and 10.5 g. of isopropyl-2,5-endomethylene-$\Delta^3$-tetrahydrophenyl methyl malonic acid diethyl ester are added to said solution. Said malonic acid ester is obtained, for instance, according to Example 11. The mixture is heated in an oil bath at 100–120° C. for 20 hours, whereby the alcohol is distilled off. The reaction product is dissolved in water, the aqueous solution is filtered over decolorizing carbon, and the colorless filtrate is acidified with dilute hydrochloric acid. The resulting crystalline precipitate is filtered off, dried, and recrystallized from a mixture of benzene and petroleum ether (1:3). Its melting point is 160–161° C. Yield: About 72% of the theoretical yield.

*Analysis.*—Calculated—10.1% N. Found—9.8% N.

Example 36.—*5-methyl-5-(2,5-endomethylene-$\Delta^3$-tetrahydrophenyl) barbituric acid*

1.6 g. of sodium metal are dissolved in 60 cc. of absolute ethanol. 4.2 g. of urea, or 7.2 g. of acetyl urea, and 14.5 g. of methyl-2,5-endomethylene-$\Delta^3$-tetrahydrophenyl malonic acid diethyl ester obtained according to Example 10 are added to said solution. The mixture is heated to a temperature between 80° C. and 150° C. whereby the alcohol is gradually distilled off. The reaction product is dissolved in water, the aqueous solution is filtered over decolorizing carbon and the colorless filtrate is acidified by the addition of dilute hydrochloric acid. The resulting precipitate is recrystallized from water. Its melting point is 210–212° C. Yield: About 75% of the theoretical yield.

*Analysis.*—Calculated—11.95% N. Found—11.94% N.

Example 37.—*5-butyl-5-(2,5-endomethylene-$\Delta^3$-tetrahydrophenyl) barbituric acid*

1.6 g. of sodium metal are dissolved in 50 cc. of absolute ethanol. 4.2 g. of urea, or 7.2 g. of acetyl urea, and 15.4 g. of butyl-2,5-endomethylene-$\Delta^3$-tetrahydrophenyl malonic acid diethyl ester prepared according to Example 12 are added to said solution. The mixture is heated at a temperature between 80° C. and 150° C. for 10 hours while stirring, whereby the alcohol is gradually distilled off. The reaction product is dissolved in water, the solution is filtered over decolorizing carbon, and the filtrate is acidified by the addition of a dilute mineral acid or of dilute acetic acid. The resulting precipitate is filtered off by suction and is recrystallized from water while still wet. Its melting point is 165–166° C. Yield: About 70% of the theoretical yield.

*Analysis.*—Calculated—10.4% N. Found—10.2% N.

Example 38.—*5-(2,5-endomethylene-$\Delta^3$-tetrahydrophenyl) barbituric acid*

2.3 g. of sodium metal are dissolved in 100 cc. of absolute ethanol. 6.0 g. of urea and 20.2 g. of 2,5-endomethylene-$\Delta^3$-tetrahydrophenyl malonic acid diethyl ester obtained according to Example 5 are added to said solution. The mixture is boiled under reflux for 12 hours while stirring. Thereafter the alcohol is removed by evaporation, the residue is dissolved in water, the aqueous solution is filtered over decolorizing carbon, and the colorless filtrate is acidified by the addition of dilute hydrochloric acid. The resulting precipitate is recrystallized from water. Its melting point is 227° C. Yield: About 77% of the theoretical yield.

*Analysis.*—Calculated—12.7% N. Found—12.56% N.

Example 39.—*5-isoamyl-5-(2,5-endomethylene-$\Delta^3$-tetrahydrophenyl) barbituric acid*

3.9 g. of sodium metal are dissolved in 120 cc. of absolute ethanol. Said solution is allowed to run into a mixture of 10.0 g. of urea and 29.0 g. of iseoamyl-2,5-endomethylene-$\Delta^3$-tetrahydrophenyl malonic acid diethyl ester obtained according to Example 15 within 15 hours while stirring. Thereby the mixture is heated to cause distillation of the alcohol. The residue is heated in a vacuum at 120–130° C. for 4 hours. The reaction mixture is cooled and dissolved in water. The aqueous solution is extracted with ether and is then filtered over decolorizing carbon. The colorless filtrate is acidified by the addition of dilute hydrochloric acid. The resulting prceipitate is recrystallized from 50% aqueous methanol. The recrystallized barbituric acid melts at 210° C. Yield: About 75% of the theoretical yield.

*Analysis.*—Calculated—9.69% N. Found—9.94% N.

Example 40.—*5-ethyl-5-(2,5-endomethylene-$\Delta^3$-tetrahydrophenyl)-2-thiobarbituric acid*

56.0 g. of ethyl-2,5-endomethylene-$\Delta^3$-tetrahydrophenyl malonic acid diethyl ester obtained according to Example 4 and 30.4 g. of thiourea are dissolved in 200 cc. of absolute ethanol while heating. A solution of 9.2 g. of sodium metal in 300 cc. of absolute ethanol is allowed to run into said solution within 15 hours while stirring and distilling off the alcohol. Thereafter the reaction mixture is heated in a vacuum at 120–130° C. for 2 more hours. The residue is dissolved in water. The aqueous solution is filtered over decolorizing carbon and the colorless filtrate is acidified with dilute hydrochloric acid. The resulting precipitate is recrystallized from benzene and 50% aqueous methanol. The recrystallized thiobarbituric acid melts at 206–208° C. Yield: About 62% of the theoretical yield.

*Analysis.*—Calculated—10.6% N. Found—10.9% N.

Example 41.—*5-ethyl-5-(2,5-endomethylene-$\Delta^3$-tetrahydrophenyl)-1-methyl barbituric acid.*

4.6 g. of sodium metal are dissolved in 200 cc. of absolute ethanol. Said solution is allowed to run into a boiling mixture of 14.8 g. of dry methyl urea and 27.8 g. of ethyl-2,5-endomethylene-$\Delta^3$-tetrahydrophenyl malonic acid diethyl ester, obtained according to Example 4, in 200 cc. of absolute ethanol within 8 hours while stirring. At the same time about 200 cc. of alcohol are distilled off. The residue is then heated in a vacuum on a boiling water bath for 4 more hours. After cooling, it is dissolved in about 300 cc. of water. The aqueous solution is extracted by shaking with ether and is filtered over decolorizing carbon. The filtrate is acidified by the addition of dilute hydrochloric acid and the resulting crystalline precipitate is repeatedly recrystallized from aqueous methanol. The recrystallized barbituric acid melts at 161–163° C. Yield: About 66% of the theoretical yield.

*Analysis.*—Calculated—10.68% N. Found—10.72% N.

Example 42.—*5-allyl-5-(2,5-endomethylene-$\Delta^3$-tetrahydrophenyl)-1-methyl barbituric acid*

14.8 g. of methyl urea and 29.0 g. of allyl-2,5-endomethylene-$\Delta^3$-tetrahydrophenyl malonic acid diethyl ester obtained according to Example 6 are dissolved in 200 cc. of absolute ethanol. A sodium ethylate solution obtained from 4.6 g. of sodium metal and 200 cc. of absolute ethanol is allowed to run into said solution within 8 hours while stirring vigorously. At the same time the temperature of the reaction mixture is kept so high that the alcohol is distilled off from said mixture. The residue, thereafter, is heated in a vacuum in a boiling water bath for one more hour and is then dissolved in 250 cc. of water. The solution is extracted with ether, filtered over decolorizing carbon, and the resulting colorless filtrate is acidified by the addition of dilute hydrochloric acid. The precipitate obtained thereby is twice recrystallized from methanol. The recrystallized barbituric acid melts at 143–144° C. Yield: About 68% of the theoretical yield.

*Analysis.*—Calculated—10.2% N. Found—10.14% N.

*Example 43.*—5-ethyl-5-(2,5-endomethylene-Δ³-tetrahydrophenyl)-1-methyl-2-thiobarbituric acid 18.0 g. of methyl thiourea and 28.0 g. of ethyl-2,5-endomethylene-Δ³-tetrahydrophenyl malonic acid diethyl ester are dissolved in 200 cc. of absolute n-butanol. A solution of 4.6 g. of sodium metal in 200 cc. of absolute n-butanol is added drop by drop at 100° C. within 8 hours to said solution. Thereafter the alcohol is distilled off in a vacuum and the residue is heated at 120° C. for 4 more hours. The reaction product is dissolved in water, the aqueous solution is extracted by shaking with ether, filtered over decolorizing carbon, and the filtrate is acidified by the addition of dilute hydrochloric acid. The resulting precipitate is recrystallized from methanol. The recrystallized thiobarbituric acid has a melting point of 170–174° C. Yield: About 53% of the theoretical yield.

*Analysis.*—Calculated—10.05% N. Found—10.5% N.

*Example 44.*—5-ethyl-5-(2,5-endomethylene-Δ³-tetrahydrophenyl)-1-methyl barbituric acid 26.5 g. of ethyl-2,5-endomethylene-Δ³-tetrahydrophenyl malonic acid diethyl ester prepared according to Example 4, or 21.0 g. of ethyl-2,5-endomethylene-Δ³-tetrahydrophenyl cyano acetic acid ethyl ester, and 14.0 g. of methyl guanidine, or 18.6 g. of methyl dicyano diamide, are dissolved in 150 cc. of absolute ethanol. A solution of 4.4 g. of sodium metal in 150 cc. of absolute ethanol are allowed to run into said solution within 12 hours while stirring and gradually distilling off the alcohol. The reaction product is then heated for 4 more hours in a vacuum at 100–120° C. The residue is dissolved in water, the aqueous solution is extracted by shaking with ether, filtered over decolorizing carbon, and the colorless filtrate is acidified by the addition of dilute hydrochloric acid. The imino or cyano imino compound, respectively, obtained thereby in the form of a crystalline precipitate, is filtered off by suction and is saponified, while still wet, by boiling with 100 cc. of dilute hydrochloric acid for 48 hours. The saponification product obtained in the form of a crystalline precipitate is filtered off and recrystallized from aqueous methanol. Its melting point is 161–163° C. The yield is between 50% to 60% of the theoretical yield. The compound is identical with the compound obtained according to Example 46.

*Example 45.* — 5-ethyl-5-(2,5-endomethylene-Δ³-tetrahydrophenyl) barbituric acid 9 g. of 5-(2,5-endomethylene-Δ³-tetrahydrophenyl) barbituric acid contained according to Example 38, are dissolved in 60 cc. of absolute methanol. 7.9 cc. of a 30% sodium methylate solution in methanol and 4.9 g. of ethyl-bromide are added to said solution and the mixture is stirred at room temperature for 48 hours, whereby the alkaline reaction disappears. Thereafter the methanol is evaporated, water is added to the residue, and the resulting precipitate is recrystallized from water. Its melting point is 196–197° C. The yield amounts to 85–90% of the theoretical yield. The compound is identical with the compound according to Example 33.

*Example 46.* — 5-allyl-5-(2,5-endomethylene-Δ³-tetrahydrophenyl)-1-methyl-barbituric acid 26.0 g. of 5-allyl-5-(2,5-endomethylene-Δ³-tetrahydrophenyl) barbituric acid prepared according to Example 34 or 36 are dissolved in 100 cc. of N sodium hydroxide solution. 12.6 g. of dimethyl sulfate are added drop by drop at room temperature to said solution while stirring vigorously. Thereby a precipitate is formed under generation of heat. Said precipitate is separated by filtration and is recrystallized from methanol. Its melting point is 143–144° C. The yield amounts to about 65% of the theoretical yield. The resulting compound is identical with the compound according to Example 18.

In place of the substituted malonic acid ester starting materials used in Examples 25 to 46, there may be employed equimolecular amounts of other substituted malonic acid esters or substituted cyano acetic acid esters as they are obtained according to Examples 1 to 24 and with the starting materials listed after Example 24. The reaction is in principle the same as described in detail in said preceding Examples 25 to 46.

In place of acetyl urea used, for instance, in Example 26, of methyl acetyl urea used in Example 32, and of other urea, thiourea, and guanidine derivatives used in the preceding Examples 25 to 46, there may be employed equimolecular amounts of other substituted urea, thiourea, guanidine and the like compounds, such as for example:

Ethyl urea
n-Amyl urea
Dodecyl urea
n-Propyl thiourea
Isobutyl thiourea
Phenyl urea
o-Tolyl urea
p-Tolyl thiourea
Formyl urea
Propionyl urea
Caproyl urea
Benzoyl urea
Phenyl acetyl urea
Cyclopentyl acetyl urea
Acryl urea
Ethyl guanidine
Isoamyl guanidine
Acetyl guanidine
Butyryl guanidine and others.

While we have described certain preferred products and certain preferred methods for purposes of illustration, it will be understood that various modifications and changes may be made from the products and processes described without departing from the spirit of our invention or the scope of the following claims.

We claim:

1. As a product of manufacture, a barbituric compound having the structural formula

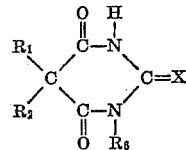

wherein R is a 2,5-endomethylene-Δ³-tetrahydrophenyl radical of the formula

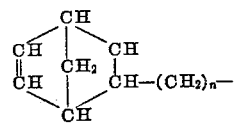

wherein $n$ is an integer from 0 to 3, inclusive, $R_2$ is selected from the group consisting of alkyl radicals with from 1 to 6 carbon atoms and alkenyl radicals with from 1 to 6 carbon atoms, X is selected from the group consisting of oxygen, sulfur and the imino radical, and $R_6$ is selected from the group consisting of hydrogen and methyl.

2. 5 - ethyl - 5 - (2,5 - endomethylene - $\Delta^3$ - tetrahydrophenyl) barbituric acid.

3. 5 - allyl - 5 - (2,5 - endomethylene - $\Delta^3$ - tetrahydrophenyl) barbituric acid.

4. 5 - allyl - 5 - (2,5 - endomethylene - $\Delta^3$ - tetrahydrophenyl) thiobarbituric acid.

5. 5 - ethyl - 5 - (2,5 - endomethylene - $\Delta^3$ - tetrahydrophenyl)-thiobarbituric acid.

6. 5 - allyl - 5 - (2,5 - endomethylene - $\Delta^3$ - tetrahydrophenyl)-1-methyl-barbituric acid.

7. The process of producing barbituric compounds having the structural formula

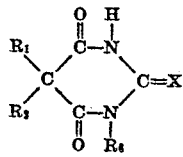

wherein R is a 2,5-endomethylene-$\Delta^3$-tetrahydrophenyl radical of the formula

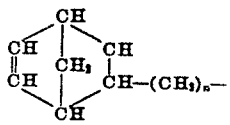

wherein $n$ is an integer from 0 to 3, inclusive, $R_2$ is selected from the group consisting of alkyl radicals with from 1 to 6 carbon atoms and alkenyl radicals with 1 to 6 carbon atoms, X is selected from the group consisting of oxygen, sulfur and the imino radical, and $R_6$ is selected from the group consisting of hydrogen and methyl, which comprises subjecting a compound selected from the group consisting of malonic acid esters having the structural formula

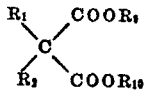

wherein $R_1$ and $R_2$ have the same meaning as indicated above and $R_9$ and $R_{10}$ are alkyl radicals with from 1 to 5 carbon atoms, and cyano acetic acid esters having the structural formula

wherein $R_1$ and $R_2$ have the same meaning as indicated above and $R_{10}$ is an alkyl radical with from 1 to 5 carbon atoms, to a condensation reaction with a urea compound having the structural formula

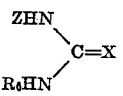

wherein $R_6$ and X have the same meaning as indicated above and Z is selected from the group consisting of hydrogen and acetyl, at a temperature from 80 to 140° C. in the presence of an alkali metal alcoholate condensation promoter and in the presence of a lower aliphatic alcohol as an inert solvent, the ratio of reactants being at least 1.1 mols of urea compound and at least 1.1 mols condensation catalyst for each mol of malonic acid ester and cyano acetic acid ester present in the reaction mixture.

8. The process of producing barbituric compounds as in claim 7, wherein the condensation catalyst is selected from the group consisting of methylates, ethylates, n-propylates, isopropylates, n-butylates, isobutylates and tertiary butylates of sodium and magnesium.

9. The process of producing barbituric compounds as in claim 7, wherein the inert solvent is selected from the group consisting of methanol, ethanol, n-propanol, isopropanol, n-butanol, isobutanol and tertiary butanol.

References Cited in the file of this patent
UNITED STATES PATENTS

| | | |
|---|---|---|
| 2,006,610 | Tabern | July 2, 1935 |
| 2,019,936 | Shonle | Nov. 5, 1935 |
| 2,035,317 | Heilner | Mar. 24, 1936 |
| 2,156,346 | Martin | May 2, 1939 |
| 2,222,455 | Cope | Nov. 19, 1940 |
| 2,260,800 | Bush | Oct. 28, 1941 |
| 2,266,718 | Bludworth | Dec. 16, 1941 |
| 2,313,501 | Bachman et al. | Mar. 9, 1943 |
| 2,373,011 | Britton | Apr. 3, 1945 |

U. S. DEPARTMENT OF COMMERCE
PATENT OFFICE

CERTIFICATE OF CORRECTION

Patent No. 2,820,035            January 14, 1958

Heinz Scheffler et al.

It is hereby certified that error appears in the printed specification of the above numbered patent requiring correction and that the said Letters Patent should read as corrected below.

Column 2, line 4, for "fololwing" read --following--; line 20, for "indicates" read --indicate--; column 5, line 35, for "soliution" read --solution--; column 8, line 19, for "fraction" read --fractionation--; column 9, line 13, for "Field" read --Yield--; column 10, line 45, for "500 cc." read --50 cc.--; column 14, line 14, for "iseoamyl-" read -- isoamyl- --; column 15, line 65, for "contained" read --obtained--; column 16, line 65 and column 17, line 23, for "wherein R" read --wherein $R_1$--.

Signed and sealed this 8th day of April 1958.

(SEAL)
Attest:

KARL H. AXLINE            ROBERT C. WATSON
Attesting Officer           Commissioner of Patents